July 11, 1961

B. DUBSKÝ ET AL 2,992,388

ELECTROMAGNETIC PRESSURE GAGE

Filed Sept. 23, 1958

INVENTORS
Bořivoj Dubský, Oldřich Straka

July 11, 1961  B. DUBSKÝ ET AL  2,992,388
ELECTROMAGNETIC PRESSURE GAGE
Filed Sept. 23, 1958  2 Sheets-Sheet 2

INVENTORS.
Bořivoj Dubský
BY Oldřich Straka

United States Patent Office 2,992,388
Patented July 11, 1961

2,992,388
ELECTROMAGNETIC PRESSURE GAGE
Bořivoj Dubský and Oldřich Straka, Prague, Czechoslovakia, assignors to Vyzkumny a Zkusebni letecky ustav, Letnany, near Prague, Czechoslovakia
Filed Sept. 23, 1958, Ser. No. 762,728
4 Claims. (Cl. 323—92)

The present invention relates to an electromagnetic pressure gage, in particular for measuring high pressures.

The pressure gage according to the invention makes use of the magnetic properties of ferromagnetic materials.

There are many types of pressure gages for measuring high pressures. The majority of them are diaphragm pressure gages of the directly indicating type or pressure gages using a Bourdon tube. For the purpose of registration, control and centralised survey it is advantageous to transform pressure into an electric value. There are again many ways of effecting such a transformation, but most devices serving this purpose are relatively intricate instruments with a relatively low accuracy.

The electromagnetic pressure gage according to the present invention is relatively simple, cheap, easy to manufacture and requires only easily obtainable material, while it is fully efficient in use. The instruments required for cooperation with this pressure gage are also simple and do not require the use of electronic tubes.

According to the underlying principle of the new electromagnetic pressure gage the measured pressure is transformed into twisting of a ferromagnetic rod. In a further development of the invention a known phenomenon is made use of, which resides therein that when twisting a cylindrically magnetised ferromagnetic rod an electromotive force, proportional to the twist of the rod, is induced in a coil surrounding the rod. This electromotive force is then utilized in a pick-up circuit, either directly by a gage or by a registering apparatus, by a relay controlling the operation of a machine or the like.

The accompanying drawing shows in a diagrammatic representation two examples of a pressure gage according to the present invention.

Figure 1:
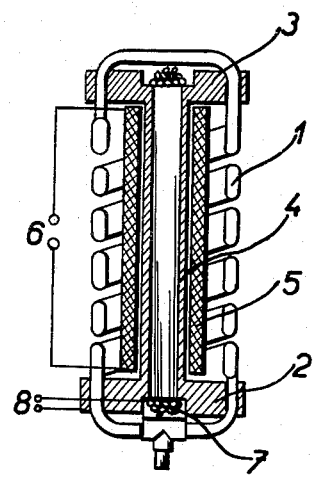
FIG. 1 is a sectional view of one embodiment of the pressure gage.

FIG. 1 shows a pressure gage which comprises a flattened helical tube 1 secured to a base 2 and provided with an end wall 3. The base 2 and the end wall 3 are rigidly connected to a torsion rod 4 of ferro-magnetic material on which a coil 5 is loosely fitted, said coil being connected to terminals 6. A toroidal coil 7 extends through the torsion rod 4, said toroidal coil being connected to terminals 8.

Pressure is admitted into the tube 1, which by the influence of the pressure tends to uncoil itself, with the result that by the intermediary of the end wall 3 it imparts a torsional stress to the torsion rod 4. If exciting alternating current is supplied over the terminals 8 to the toroidal coil 7, the twisting of the torsion rod 4 produces a deformation of the original cylindrical magnetic field so as to create a longitudinal component which induces in the coil 5 an electromotive force, fed to the terminals 6.

This electromotive force is proportional to the admitted pressure. In the pressure gage shown the exciting circuit may be exchanged for the pick-up circuit.

Figure 2:
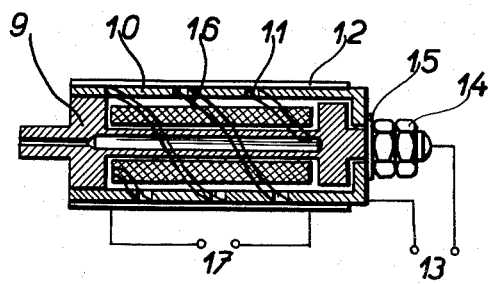
FIG. 2 shows in a cross sectional view a modification thereof.

FIG. 2 shows a pressure gage which comprises a torsional body 9 of ferromagnetic material, the flanges of which are connected to a casing 10 in which helical slots 11 are provided. The casing 10 is bridged by conductors 12 and attached to one of the terminals 13. The casing 10 is connected to the torsional body 9 by means of nuts 14, an insulating washer 15 being placed below the nuts. The connection of the casing 10 with the torsional body 9 at the end where the nuts 14 are provided, is insulated and at the other end made conductive. The insulated end of the torsional body 9 is attached to the other terminal 13. Loosely fitted on the torsional body 9 is a coil 16, connected to terminals 17.

High pressure admitted into the torsional body 9 produces a lengthening thereof. The lengthening is counteracted by the casing 10, which due to the arrangement of the helical slots 11 produces a torque, generating a torsional stress in tthe torsional body 9. Exciting alternating current supplied over the terminals 13, flows through the torsional body 9 and back on the one hand through the casing 10 and on the other hand, through conductors 12. A cylindrical magnetic field is thus produced in the torsional body 9, said magnetic field being deformed under the influence of the torsional stress so as to produce a longitudinal component which induces in the coil 16 an electromotive force which is supplied to terminals 17. This electromotive force is proportional to the admitted pressure. Also in this case the exciting circuit may be exchanged for the pick-up circuit.

Figure 3:
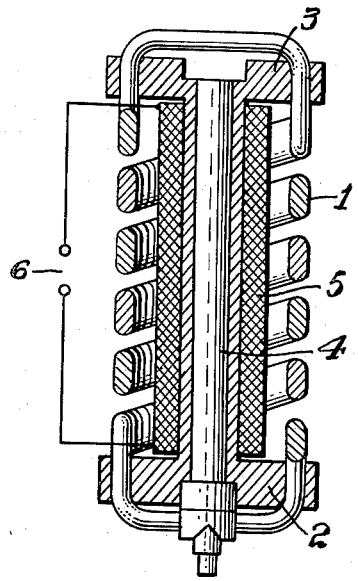
FIG. 3 is a view similar to FIG. 1 and shows a slight modification of the gage of FIG. 1.
Figure 4:
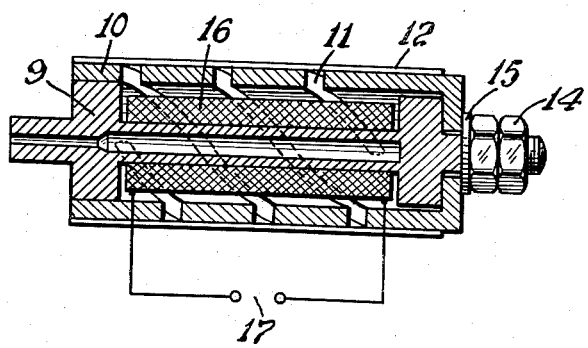
FIG. 4 shows in a view similar to FIG. 3 a slight modification of the gage of FIG. 3.

The gage illustrated in FIG. 3 is like the one of FIG. 1, except that the torsional body 4 is formed by a permanent magnet, and similarly, the gage of FIG. 4 is like the one shown in FIG. 2, except that the torsional body 9 is formed by a permanent magnet.

For dynamic pressure changes it is in this case highly advantageous to make the torsional body 9 from a cylindrically magnetised permanent magnet; the exciting circuit can be dispensed with and the outflowing electromotive force is proportional to the velocity of the pressure change. The pressure gage is very well suited e.g. for tracing the pressures in internal combustion engines by means of an oscillograph.

We claim:

1. An electromagnetic pressure gage comprising, in combination, an elongated torsional body of ferromagnetic material having a longitudinal axis; a helically shaped body substantially coaxial with said torsional body and having two longitudinal ends secured to the longitudinal ends of said torsional body, one of said bodies being formed with a longitudinal cavity therein; an exciting circuit for magnetizing said ferromagnetic body; a substantially coaxial pick-up coil surrounding said torsional body; a pick up circuit connected to said pick up coil for sensing electromagnetic forces induced therein; and means for admitting a fluid to said cavity for gaging the pressure of said fluid by said induced electromagnetic forces.

2. An electromagnetic pressure gage as claimed in claim 1, wherein said helically shaped body is a helically wound tube formed with said cavity therein for the admission of said fluid.

3. An electromagnetic pressure gage as claimed in claim 1, wherein said helically shaped body is a casing provided with helical slots and with longitudinal conductors, the torsional body having the shape of a straight tube formed with said cavity therein for the admission of said fluid.

4. An electromagnetic pressure gage comprising, in combination, an elongated torsional body of permanently magnetic material having a longitudinal axis; a helically shaped body substantially coaxial with said torsional body and having two longitudinal ends secured to the longitudinal ends of said torsional body, one of said bodies being formed with a longitudinal cavity therein; a substantially coaxial pick-up coil surrounding said torsional body; a pick up circuit connected to said pick up coil for sensing electromagnetic forces induced therein; and means for admitting a fluid to said cavity for gaging the pressure of said fluid by said induced electromagnetic forces.

References Cited in the file of this patent

UNITED STATES PATENTS 2,511,178   Roters _____ June 13, 1950